UNITED STATES PATENT OFFICE.

ELKAN BAUER, OF VIENNA, AUSTRIA-HUNGARY.

PROCESS OF AND COMPOSITION FOR THE MANUFACTURE OF SUBSTITUTES FOR LEATHER, HORN, TORTOISE-SHELL, &c.

SPECIFICATION forming part of Letters Patent No. 277,977, dated May 22, 1883.

Application filed February 20, 1883. (No specimens.)

*To all whom it may concern:*

Be it known that I, ELKAN BAUER, a citizen of Austria, residing at Vienna, Austria, have invented a new Process of and Composition for the Manufacture of a Substitute for Leather, Horn, Tortoise-Shell, &c.; and I do hereby declare that the following is a full, clear, and exact description of the invention, which will enable others skilled in the art to which it appertains to make and use the same.

My invention relates to a process of manufacturing a new compound by mixing animal albuminous matters with glycerine and a fat or oil, and by treating such mixture or combination with tannic substances or tannic acid.

This compound is hardly inflammable, insoluble in water, and may be produced in different degrees of hardness, according to the proportions of the mixed materials—viz., soft, like leather or caoutchouc, or hard, like bone, horn, or tortoise-shell; and a variety of objects can be made from it which, until now, have been manufactured of leather, caoutchouc, bone, horn, or tortoise-shell; or it can be employed for the impregnation of webs or cloths and for the manufacture of water-proof and non-inflammable stuffs.

This compound I call "Austrian Universal Substance;" and in order that my invention may be clearly understood, and the manner in which the same may be used and carried into effect, I will now proceed to describe it as follows:

Albuminous animal matters—as, for example, the albumen of eggs, the blood of animals, (serum,) or other animal refuse or waste, like tendons, muscles, gristles, bones, leather, and the like, (known in commerce as "glue" or "gelatine")—either alone or in combination with vegetable gluten, (dextrine, gums,) are mixed with glycerine, fat or oil, and for certain fabrics with a solution of caoutchouc. When using hard albuminous animal matters, the same are steeped in a vessel in cold water until completely swollen, and then heated at a lower temperature than boiling water. The albumen is thus dissolved, and glycerine, fat or oil, and finally a solution of caoutchouc, is to be added as long as the solution is still in a warm state, and thoroughly mixed until a uniform combination of the materials is obtained. By using liquid albumen the steeping in water is dispensed with. If there is a difficulty in obtaining an intimate mixture, Venice soap or carbonate of or caustic soda or caustic potash may be added to the mixture and continuously stirred till the mixing or combination is a perfect and uniform one. By adding water to the mixture during its heating every desired degree of fluidity can be obtained.

With reference to the proportions of the materials employed, the degree of hardness and brittleness of the compound depends upon the quantity of the albuminous matters contained in it, so that an increase of the latter causes a higher and a diminution of albumen a lower degree of hardness. The following example of combination gives a soft leather or caoutchouc like product, viz: about two and one-half parts, by weight, of gelatine or glue; about one and one-half to three parts, by weight, of glycerine; about one and one-half to three parts, by weight, of fat vegetable oil, (olive or castor oil;) about one-half to one part, by weight, of a concentrated solution of caoutchouc; while the following combination furnishes a mass hard like bone or horn, viz: about five parts, by weight, of albuminous matter; about one part, by weight, of glycerine, and about one-half to one part, by weight, of oil. By varying the proportions within the above limits, compounds of every desired degree of hardness may be produced.

The compound obtained in the before-described manner may be used in its natural color, which differs according to the nature of the employed materials, or it may be colored by adding pigments to it, as hereinafter described. The further process after the mixture differs according to the nature of the objects to be manufactured.

*a.* In case soft or hard plates are desired to be made, and which ought to be worked up to resemble pasteboard, leather, horn, or tortoise-shell, the mixed compound, with or without any color and in a liquid and still warm state, is poured on a horizontal plate of metal, glass, china, stone, wood, (varnished or polished,) and left until it is stiffened. At this stage I take care that no air-bubbles are formed in the poured mass. The requisite fluidity of the compound for thin layers is obtained by adding water in its warm state. The stiffened thin layer can be easily taken off from the base-plate, and is afterward dried on stretching-frames. The compound, when dried, is tanned like leather by immersing the same into moistened or liquid tannic substances, (as tan, bark, alum, tannic acid,) and leaving it therein from two to twenty-four hours, according to the thickness of the layers, which process is accelerated if an electric current is conducted through the compound. When the mass is sufficiently tanned it is taken out of the tan-bath and dried.

*b.* If plastic objects, like cups, goblets, bags, &c., have to be directly formed from the compound by casting or steeping, the warm and liquid mass, like any other material, is poured into a mold of glass, porcelain, metal, stone, or polished wood, or the latter is dipped into the liquid mass, and then taken out from it, so that, according to the more or less fluidity of the mass, a thinner or thicker layer rests in or upon the mold. After it has become sufficiently stiffened the compound is drawn out from the mold, then tanned, as hereinbefore described, and replaced into or upon the form, as the case may be, in order to be dried.

*c.* If the mass or compound is used for the manufacture of impregnated or other fabrics similar to wax-cloth, it is poured on a plate and left there until stiffened, as heretofore stated. Then the web to be treated is impregnated with a thin liquid solution of the mass, and extended and pressed upon the stiffened plate, after which the air-bubbles are removed by rubbing the surface. The web, with the layer, is then drawn from the base-plate, dried on stretching-frames, and again tanned and dried, as hereinbefore described.

*d.* In case loose fibers are used for the manufacture of felt or felt-like cloth, the mass is poured on a plate. Then the prepared fibers are spread uniformly (in preference by means of a sieve) over and into the still liquid compound. After stiffening, the felt-like product is taken off from the plate and dried, then tanned, and again dried and compressed.

The coloration of the mass is effected when the mixture is still in a liquid and warm state. In order to obtain a uniform coloration, the liquid or finely-powdered pigment must be intimately mixed within the mixture. In order to produce a marbled or changeable lustered coloration, the liquid mass to be colored is first poured into several smaller pots or vessels, into each of which the proper pigments are added, and then the materials contained in each vessel are mixed. These several mixtures, still in a liquid condition, are then taken from the single vessels in the manner used in marbling or veining, and poured and divided over a glass or china plate, a brush or thin stick being employed to aid in producing the desired effect. The marbling or veining, the latter particularly—as, for instance, for producing the imitation of tortoise-shell—can be obtained in such a way that the finished, tanned, and single-colored mass becomes marbled or veined by applying the proper pigments on it with a brush.

I claim—

1. The described compound, hardly inflammable, and insoluble in water, the same being composed of gelatine or glue, glycerine, fat or oil, and caoutchouc, in substantially the proportions above named, and treated with tannic acid, all substantially as set forth.

2. The hereinbefore-described process for making a substitute for leather, horn, tortoise-shell, caoutchouc, wax-cloth, &c., the same consisting in mixing albuminous animal matters with glycerine, fat or oil, and also with dissolved caoutchouc, and treating the same with tannic substances, the tanning process being accelerated by electric currents.

Vienna, this 29th day of January, 1883.

ELKAN BAUER.

Witnesses:
ED SCHMIDT,
JAMES RILEY WEAVER.